US011207652B2

(12) United States Patent
    Find et al.

(10) Patent No.: US 11,207,652 B2
(45) Date of Patent: Dec. 28, 2021

(54) DEVICE AND METHOD FOR CATALYTICALLY CONVERTING CHEMICAL SUBSTANCES AT DWELL TIMES IN THE RANGE OF 0.1-10 SECONDS

(71) Applicant: hte GmbH the high throughput experimentation company, Heidelberg (DE)

(72) Inventors: Josef Find, Bruckmuehl (DE); Kurt-Erich Finger, Heidelberg (DE); Markus Friess, Heidelberg (DE)

(73) Assignee: BASF SE, Heidelberg (DE)

( * ) Notice: Subject to any disclaimer, the term of this patent is extended or adjusted under 35 U.S.C. 154(b) by 0 days.

(21) Appl. No.: 16/631,270

(22) PCT Filed: Jul. 25, 2018

(86) PCT No.: PCT/EP2018/070090
    § 371 (c)(1),
    (2) Date: Jan. 15, 2020

(87) PCT Pub. No.: WO2019/020655
    PCT Pub. Date: Jan. 31, 2019

(65) Prior Publication Data
    US 2020/0139326 A1    May 7, 2020

(30) Foreign Application Priority Data
    Jul. 28, 2017    (EP) .................................... 17183734

(51) Int. Cl.
    *B01J 8/18*    (2006.01)
    *B01J 8/24*    (2006.01)
    *C10G 11/18*   (2006.01)

(52) U.S. Cl.
    CPC ........... *B01J 8/1809* (2013.01); *B01J 8/1881* (2013.01); *B01J 8/24* (2013.01); *C10G 11/18* (2013.01);
    (Continued)

(58) Field of Classification Search
    CPC . B01J 8/1809; B01J 8/1881; B01J 8/24; B01J 8/388; B01J 2208/00539;
    (Continued)

(56) References Cited

U.S. PATENT DOCUMENTS 4,118,305 A * 10/1978 Oloman .................... C25B 1/30
                                                      204/265
4,120,826 A * 10/1978 Ebel ........................ B01J 21/04
                                                      502/221
(Continued)

FOREIGN PATENT DOCUMENTS

WO    WO 01/70906 A1    9/2001
WO    WO 2012/052149 A2    4/2012
WO    WO 2016/166153 A1    10/2016

OTHER PUBLICATIONS

European Search Report dated Jan. 16, 2018 in Patent Application No. 17183734.7 (with English translation of categories of cited documents), 4 pages.
(Continued)

*Primary Examiner* — Lessanework Seifu
(74) *Attorney, Agent, or Firm* — Lowenstein Sandler LLP (57) ABSTRACT

Disclosed herein is an apparatus and a method for catalytic conversion of chemical substances in the presence of pulverulent catalysts in a trickle bed reactor with residence times in the range of 0.1-10 seconds, wherein the apparatus includes a trickle bed reactor (2), the inlet side of which is functionally connected to a catalyst reservoir vessel (1) and a reactant feed, and the outlet side of which is functionally
(Continued)

connected to a separator (3). The separator (3) has an exit conduit for leading off product stream, wherein the apparatus has the characteristic feature that the exit conduit disposed on the separator (3) for leading off product stream has a continuously acting valve connected via a controller to a pressure measurement sensor, wherein the continuously acting valve and the pressure measurement sensor form a pressure control circuit with a controller.

13 Claims, 5 Drawing Sheets

(52) U.S. Cl.
CPC .............. *B01J 2208/00539* (2013.01); *B01J 2208/00557* (2013.01); *B01J 2208/00566* (2013.01); *B01J 2208/00769* (2013.01); *B01J 2219/00011* (2013.01)

(58) Field of Classification Search
CPC .... B01J 2208/00557; B01J 2208/00566; B01J 2208/00769; B01J 2219/00011; C10G 11/18
See application file for complete search history.

(56) References Cited

U.S. PATENT DOCUMENTS

| | | | |
|---|---|---|---|
| 5,093,535 A * | 3/1992 | Harrison | C07C 29/141 |
| | | | 568/881 |
| 5,569,435 A | 10/1996 | Fusco et al. | |
| 5,665,949 A | 9/1997 | Fusco et al. | |
| 6,069,012 A | 5/2000 | Kayser | |
| 7,378,059 B2 | 5/2008 | Corma Canos et al. | |
| 7,718,140 B1 | 5/2010 | Seibert et al. | |
| 2003/0019789 A1 | 1/2003 | Kwak | |
| 2003/0040116 A1 | 2/2003 | Canos et al. | |
| 2010/0187158 A1 | 7/2010 | Seibert et al. | |
| 2013/0273662 A1 | 10/2013 | Lange De Oliveira et al. | |

OTHER PUBLICATIONS

International Search Report dated Nov. 9, 2018 in PCT/EP2018/070090 filed on Jul. 25, 2018, 2 pages.

\* cited by examiner

DEVICE AND METHOD FOR CATALYTICALLY CONVERTING CHEMICAL SUBSTANCES AT DWELL TIMES IN THE RANGE OF 0.1-10 SECONDS

The invention relates to the field of catalyst research and catalyst test beds in the laboratory sector, in which liquid or else gaseous reactants are reacted with pulverulent solid catalysts with short contact times. "Short contact times" means that the residence time of the catalyst or of the reactants/products in the reactor is in the range from 0.1 to 10 seconds. The improvement in the existing laboratory methods is of great economic and industrial significance since the studies by means of laboratory methods are performable more quickly and less expensively than the studies by means of pilot plants. On the basis of the apparatus of the invention and the method of the invention, it is possible to simulate the process window of industrial scale fluidized bed reactors (e.g. riser or downer reactors) in an improved manner. The use of the invention enables saving of time and costs in the development of novel catalysts and in the optimization of methods, which would otherwise have to be expended for the operation of large pilot plants.

More particularly, the present invention relates to the simulation of the FCC process which is conducted in riser reactors on the industrial scale. The average industrial scale plants are equipped with a catalyst volume of 100-200 metric tonnes. A good representation/simulation of the industrial scale FCC process can be achieved with pilot plants that are equipped with riser reactors and are operated with catalyst volumes of around two to ten kilograms or more. With regard to the catalytic conversions, the pilot plant tests show good agreement by comparison with the plants operated on the industrial scale, but are more complex in operation than laboratory apparatuses that can be operated with catalyst volumes in the range of 1-50 grams. For representation of the industrial scale plant, a method was to be performable on laboratory scale with minimum volumes of catalyst. At the same time, in the laboratory method, the industrial operating parameters should match the industrial operating parameters of the industrial scale plant with maximum accuracy. The industrial operating parameters include, for example, temperature, contact time, WHSV (i.e. weight hourly space velocity), catalyst-to-feed ratio and pressure.

The FCC plants used on the industrial scale have riser reactors having a length of 20-40 meters. The average flow rates that exist at the exit from the industrial scale riser reactor are 10-20 meters per second. In relation to the laboratory reactors, it can be stated that these only have a length in the range of 0.5-3 meters. In order to establish a contact time in the operation of the laboratory reactor which is comparable to the contact time in the FCC plant, the flow rate of the catalyst within the laboratory reactor must be much lower than the flow rate of the catalyst in the FCC plant. The flow rate of the catalyst in the laboratory apparatus is in the range from 0.5 to 1 meter per second and is thus only $\frac{1}{20}$ of the flow rate that occurs in the riser reactors of FCC plants that are operated on the industrial scale.

The prior art discloses different apparatuses and processes that are used for cracking of oils and the associated study of FCC catalysts. In the methods, a differentiation is to be made between those methods based on the testing of the catalysts in fixed beds and those methods based on the testing of the catalysts in fluidized beds. Remarks relating to the study of catalysts in fixed beds can be found in ASTM Method No. D-3907 from 1987. Furthermore, testing in fluidized beds can be subdivided into the groups in which the catalysts are tested in statically fluidized beds and those in which the catalysts are tested in dynamically fluidized beds. One example of the analysis of FCC catalysts in statically fluidized catalyst beds is the catalyst testing apparatus described by John Kayser in U.S. Pat. No. 6,069,012. Prominent examples of the testing of catalysts in dynamically fluidized beds are testing in riser reactors and testing in downer reactors (trickle bed reactors according to the description of U.S. Pat. No. 7,378,059 B1). Furthermore, there are also other reactor types in which the catalysts are analyzed in circulating reactor beds.

It should also be noted that different apparatuses for testing of solid-state catalysts on the laboratory and pilot plant scale are known in the art. A multitude of these studies relates to the testing of the catalysts in a static arrangement in which the catalysts for analysis in the form of powders or extrudates in fixed bed packings are arranged in one or more reaction spaces. For example, WO 2012/052149 A2 describes an apparatus and a method of analyzing catalysts with variable process pressure adjustment, in which the solid-state catalysts are disposed in a reaction space. The power on the reaction space outlet side is functionally connected to a main conduit (411) and a secondary conduit (311). The main conduit (411) is functionally connected to a control valve (61) and an offgas conduit (62), and the second conduit (311) is functionally connected to a restrictor element (331) and an analysis unit (34).

US 2003/0040116 A1 to Avelino Corma et al. describes an automatic apparatus and a method of testing catalysts, which comprise a reaction block (5) comprising a set of reaction chambers (4). The interiors of the reaction chambers are suitable for accommodating catalysts (4). The catalysts are analyzed in fixed bed packings. The feed fluids are guided to the reaction chambers under controlled conditions. The reaction chambers have outlets provided with a fluid passage, connected in turn to means of analysis (8).

US 2010/0187158 A1 to UOP describes an apparatus and a method of cracking heavy hydrocarbons in the fluidized state in the reactor of an FCC plant. The cracking, which is effected in a riser reactor, generates a stream of cracked product and deactivated catalyst. In order to separate the deactivated catalyst from the cracked product stream, the stream is guided first through a main assembly for separation and then through a downstream assembly. In the downstream assembly, the stream of cracked product and deactivated catalyst is guided through a passage to a multicyclone removal apparatus. The multicyclone removal apparatus comprises many cyclones that extend through a tube layer. US 2010/0187158 A1 describes an arrangement and a method by which FCC plants are improved over those FCC plants known from the prior art. The effect of the improvement is that the FCC plants can be operated with a smaller inventory of catalyst material. According to the new design which is described in US 2010/0187158 A1, the catalyst inventory in FCC plants can be reduced by 10% to 20%. Thus, US 2010/0187158 A1 makes a contribution to improvement of commercial FCC plants.

PCT application WO 01/70906 A1 to Ho-jun Kwak describes a multistage method of producing gasoline, kerosene and diesel oil from waste plastics. The method is effected in continuous operation and on a production scale. The majority of the reaction proceeds in the catalytic cracker, with transportation of the reaction mixture through a pipe to the catalytic cracker. The apparatus is thus a specific apparatus intended for a specific purpose. In the method, waste plastic is first shredded and subjected in the form of a melt to a first catalytic reaction, in which the melt is with a nickel catalyst or a catalyst comprising a nickel alloy in order to carry out dehydrogenation and breakdown. The resulting melt is subjected to a second catalytic stage for cracking in order also to produce gasoline-containing fractions in multiple fractions. This is followed by fractionation of the cracked material into a gasoline-containing fraction, a kerosene-containing fraction and a diesel fraction.

The field of the present invention relates to the testing of catalysts in dynamically fluidized catalyst beds, in order to make the contact times between the catalyst and the feed as similar as possible to the industrial scale method. One advantage in the case of testing in dynamically fluidized catalyst beds over testing in fixed beds results from the fact that the oil can be contacted constantly with fresh catalyst in the inlet region of the reactor. Within the fixed bed reactor, the catalyst surface has been covered with coke after a start time of just a few seconds and therefore deactivated. The oil introduced into the fixed bed reactor after the start time is contacted with a catalyst having its surface covered with coke.

In U.S. Pat. No. 7,378,059 B1, Corma et al. describe an apparatus comprising a trickle bed reactor. By means of the apparatus, it is possible to conduct experiments in which short contact times between feed and catalyst are achieved. The apparatus disclosed in U.S. Pat. No. 7,378,059 B1 is suitable for analysis of rapidly deactivating catalysts. The catalyst is in a temperature-controlled reservoir vessel connected to the inlet of the trickle bed reactor. U.S. Pat. No. 7,378,059 B1 describes a trickle bed reactor as a "down transported flow reactor". At the same time, a feed is also connected to the reactor inlet. In the performance of the method, the heated catalyst and the feed are introduced into the inlet region of the reactor in the presence of a carrier gas and then guided downstream in the downward direction through the reaction space to the reactor outlet. The outlet from the reactor is connected to a catalyst separator, and the catalyst guided through the reactor is transferred from the outlet of the reactor into the catalyst separator. In the catalyst separator, the catalyst is kept in the fluidized state, with fluidization by the supply of an inert gas (for example nitrogen) that is introduced into the interior of the catalyst separator through a porous intermediate base. The catalyst separator is connected to an exit conduit that enables leading-off of the products or of the mixture of products, carrier gas and purge gas, and of the volatile feed components. The product fluids exiting from the catalyst separator are guided first to the liquid separator and onward to a gas collection vessel. For evaluation of the experiment, the products accommodated in the liquid separator and in the gas separator are quantitatively determined. In addition, the residual content of coke on the catalyst that remained adhering to the catalyst surface after the volatile product components had been driven out is determined.

One of the objects of the invention is that of providing an apparatus and a method by which the analysis of FCC catalysts in the laboratory is improved. Another requirement is that the apparatus and the method are to be suitable for performance of studies with short contact times. The apparatus used for the performance of the method was not to significantly exceed the dimensions of apparatuses and methods used to date. Furthermore, a versatile test method that can be used in different fields of industrial catalyst research was to be provided.

The aforementioned objects were achieved in that an apparatus for catalytic conversions of chemical substances in the presence of pulverulent catalysts in a trickle bed reactor with residence times in the range of 0.1-10 seconds is provided, wherein the apparatus comprises at least a trickle bed reactor (2), the inlet side of which is functionally connected to at least one catalyst reservoir vessel (1) and at least one reactant feed, and the outlet side of which is functionally connected to at least one separator (3); the at least one separator (3) has at least one exit conduit for leading off product stream, wherein the apparatus has the characteristic feature that the exit conduit disposed on the separator (3) for leading off product stream has a continuously acting valve connected via a controller to a pressure measurement sensor, wherein the continuously acting valve and the pressure measurement sensor form a pressure control circuit with a controller.

In a preferred embodiment, it is a characteristic feature of the apparatus of the invention that the catalyst reservoir vessel (1) and the separator (3) have a functional connection equipped with a pressure differential controller (6) that actuates a continuously acting valve, wherein the outlet side of the valve has either a connecting conduit to the separator (3) or a waste air conduit (19); in the case that the outlet side of the valve has a waste air conduit (19), the separator (3) is equipped with a gas feed (18) and the part of the functional connection between the pressure differential controller (6) and the separator (3) is connected to the pressure measurement sensor of the pressure differential controller (6).

Figure 2:
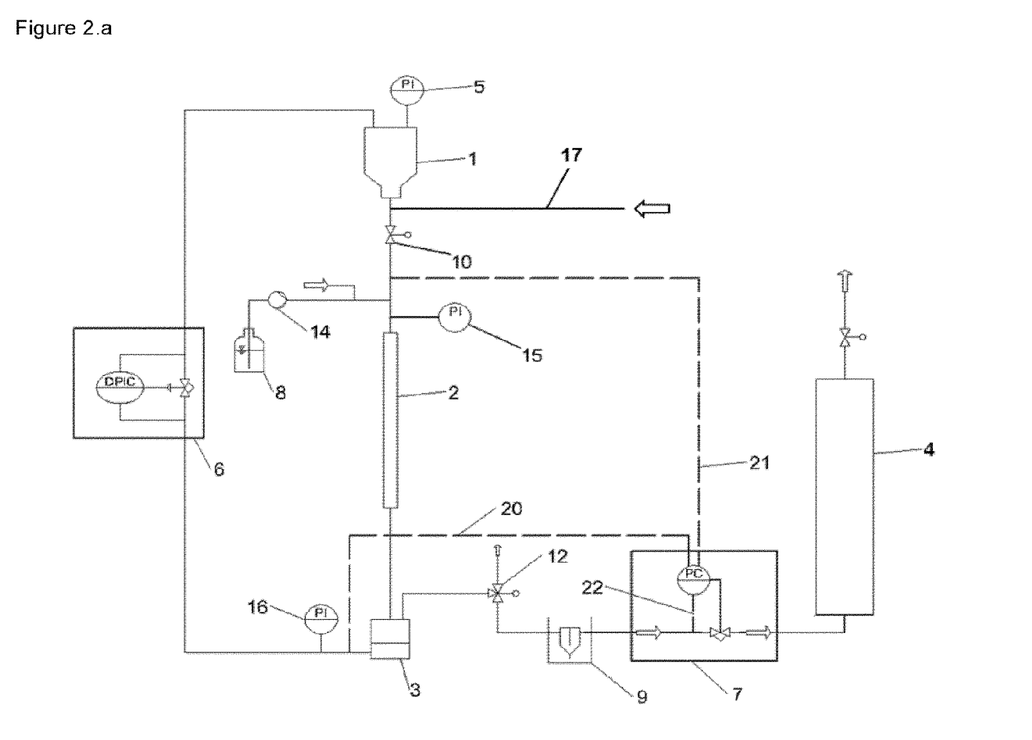

The pressure differential controller (6) makes it possible for a defined pressure gradient to exist between the catalyst reservoir vessel (1) and the trickle bed reactor (2). In this preferred embodiment, the pressure gradient serves as a driving force to transfer the catalyst from the catalyst reservoir vessel (1) into the trickle bed reactor (2). The pressure control circuit comprises a continuously acting valve having an inlet and an outlet, wherein the inlet is functionally connected to the catalyst reservoir vessel (1) and the outlet to the separator (3) or gas feed (18) thereof. In an alternative embodiment of the apparatus, it is possible that the outlet of the continuously acting valve of the pressure differential controller (6) is functionally connected to a waste air conduit (19). This configuration form is shown in FIG. 2.d. The continuously acting valve is actuated by a pressure differential controller (6), wherein the pressure differential controller (6) takes its actual values from the interior of the catalyst reservoir vessel (1) and from a region directly connected to the trickle bed reactor (2).

In the exit conduit that connects the separator (3) to the gas collection vessel (4), there is a pressure controller (7), the continuously acting valve of which is actuated by a controller. Preferably, the actual value of the control circuit is taken from the conduit between the separator (3) and the continuously acting valve.

Figure 1:
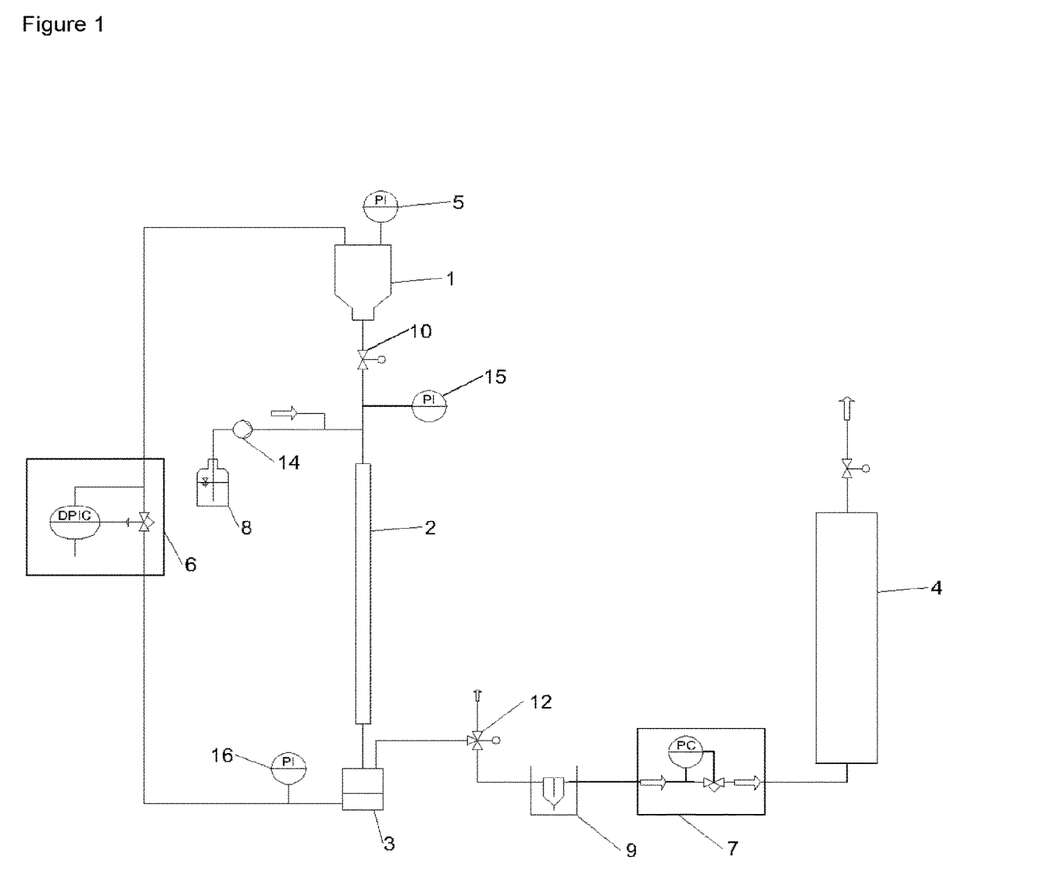
FIG. 1 shows the schematic diagram of an apparatus having a trickle bed reactor (2), specifically having an arrangement on the reaction space exit side of separator (3) functionally connected via the exit conduit to liquid separator (9) and gas collection vessel (4). The actuator valve (12) is disposed in the exit conduit between the separator (3) and the liquid separator (9), and the pressure control valve (7) between the liquid separator (9) and the gas collection vessel (4).

According to the diagrams shown in FIG. 1 and FIG. 2.a, the pressure controller is configured as the main flow control system in each case.

In another embodiment, the apparatus may be configured with a secondary flow control system, wherein the pressure-controlling element of the secondary flow control system is shown in FIG. 2.b. In that embodiment of the invention configured with a secondary flow control system, the pressure regulator (7) in the apparatus shown in FIG. 2.a would be replaced by the component shown in FIG. 2.b. With regard to the secondary flow control pressure control system, it should be noted that the actual values for the control system can be taken in the same way as for the main flow control system.

The term "control circuit" also includes a relief valve or membrane relief valve.

It is further preferable that the apparatus of the invention has means of controlling the temperature of the individual apparatus elements with which the apparatus elements from the group of catalyst reservoir vessel (1), trickle bed reactor (2) and separator (3) are independently heatable. In addition, it is preferable that the heating apparatus of the trickle bed reactor (2) is equipped with multiple heating zones and these heating zones can be separately heated and temperature-controlled.

It is also preferable that the transfer of the catalyst from the catalyst reservoir vessel (1) into the trickle bed reactor (2) is performed as described in U.S. Pat. No. 7,378,059 B2. The lower end of the catalyst reservoir vessel (1) has a funnel-shaped configuration. The end of the funnel is connected to an outlet conduit having only a small diameter. For example, the diameter of the outlet conduit is <2 mm. The outlet conduit is connected to a gas conduit feed (17). The permanent feeding of gas serves to keep the catalyst in the fluidized state in the outlet conduit and hence prevent blockages. A common conduit leads from the connection point of the outlet conduit and the gas conduit feed (17) to the inlet of the trickle bed reactor (2). The valve (10) is disposed in the common conduit. The valve (10) is preferably a high-temperature valve. The actuation of the valve (10) can start and end the catalyst supply into the trickle bed reactor (2). The diameter of the outlet conduit influences the metering rate of catalyst. Further parameters by which the catalyst metering rate is influenced result from the size of the pressure differential, the gas velocity and the catalyst characteristics.

However, other configurations of the apparatus having controlled transfer of catalyst from the catalyst reservoir vessel (1) to the trickle bed reactor (2) are also conceivable. For example, a conveying screw that conveys the catalyst powder in a controlled manner from the catalyst reservoir vessel (1) into the trickle bed reactor (2). It is important that the catalyst reservoir vessel (1) is filled with a sufficient amount of catalyst, such that the vessel is not completely emptied during the performance of the method of the invention. In a preferred embodiment of the apparatus, the catalyst reservoir vessel (1) is connected to a vibration apparatus that enables the catalyst powder to form a flat surface within the catalyst reservoir vessel (1). In the absence of the vibration apparatus, faults that result from faster outflow of the catalyst powder from the middle of the funnel, hence leading to a conical depression in the powder bed, are not ruled out. The depression in the powder bed can lead to uncontrolled gas breakthrough that prevents uniform catalyst dosage.

Individual elements of the apparatus may be equipped with pressure relief valves. If excess pressure occurs within the apparatus, the pressure relief valves can prevent damage to the apparatus. In a preferred embodiment, the catalyst reservoir vessel (1) and the separator (3) have been provided with a pressure relief valve.

In a preferred embodiment, the continuously acting valve in the pressure controller (7) is functionally connected to a pressure measurement sensor, wherein this functional connection (21) leads to the inlet feed of the trickle bed reactor (2), to the outlet region of the trickle bed reactor (2) or to the exit conduit to the product flow outlet. It is additionally preferable that the continuously acting valve in the pressure regulator (7) is functionally connected to the exit conduit to the product flow outlet; further preferably, the continuously acting valve is part of pressure controller (7).

In summary, it should be stated that the continuously acting valve disposed in the exit conduit must be connected to a pressure measurement sensor via a controller in order to form a controller. With regard to the connection to pressure measurement sensors, different embodiments are shown in FIG. 2.a. In the case of functional connection (2), the actual pressure value is taken from the region of the gas feed (18) to the separator. In the case of functional connection (21), the actual pressure value is taken from the region of the reactor inlet. In the case of functional connection (22), the actual pressure value is taken from the region of the exit conduit downstream of the separator. There are also possible embodiments that differ from the illustration in FIG. 2.a. For example, a functional connection (20') not shown in FIG. 2.a can take the actual pressure value from the conduit region between the exit from the trickle bed reactor and the separator (3).

In relation to the trickle bed reactor (2), it can be stated that this is preferably a tubular reactor. Preferably, the trickle bed reactor (2) is arranged vertically, with the longitudinal axis of the reaction tube perpendicular in relation to the horizontal plane. The perpendicular arrangement means that the enablement of the invention is in no way restricted by deviation of the longitudinal axis of the reactor at a certain angle from the vertical orientation. It is conceivable that the longitudinal axis of the reactor may have deviations from the vertical orientation of 45 degrees. However, the deviation is preferably less than 30 degrees, further preferably less than 10 degrees, and especially less than 5 degrees. The trickle bed reactor (2) is preferably a cylindrical tubular reactor having a length in the range of 0.3-3 m, further preferably of 0.5-2.5 m. The diameter of the reactor is preferably in the range of 0.3-10 cm, further preferably in the range of 0.5-5 cm and especially preferably in the range of 0.6-2 cm. In further embodiments, mention should also be made of a helically descending wound form of the reaction tube.

The catalyst reservoir vessel (1) used for the storage preferably has a catalyst capacity in the range from 0.1 to 5 liters; the catalyst capacity is further preferably in the range from 0.2 to 3.5 liters. In the case of FCC catalyst, the bulk density is in the region of about 0.9 g/cm$^3$. Therefore, about 0.9-4.5 kg may be accommodated by the catalyst reservoir vessel (1)—according to the design of the vessel. The duration of catalyst supply is in the region of about 60 seconds, with a catalyst metering rate preferably in the range of 30-150 g/min.

In a preferred embodiment, the method is performed in such a way that the catalyst-to-oil ratio (cat/oil ratio) is in the range of 1-100, the cat/oil ratio preferably being in the range of 2-30, and the cat/oil ratio further preferably being in the range of 5-25. It is preferable that a series of experiments can be carried out in each case with one charge of the catalyst reservoir vessel (1) and one charge of the reservoir vessel for liquid feeds, all of which are implemented by the method of the invention. The technical basis is that the metering of liquid is carried out via the program control system and the amount of liquid metered is simultaneously detected. The amount of catalyst supplied can be determined using a calibration of the solids metering apparatus or using a weight of the catalyst collected.

Preference is additionally given to an embodiment of the apparatus of the invention having the characteristic feature that the separator (3) has a gas feed (18).

Furthermore, preference is given to an embodiment having the characteristic feature of a gas feed (18) to the separator (3) and in which the valve actuated by the pressure differential controller (6) is connected to a gas exit conduit (19), this being a particular embodiment with regard to the connection of the at least one catalyst reservoir vessel (1) and the separator (3).

In a preferred embodiment, the apparatus of the invention is equipped with two or more catalyst reservoir vessels (1). The embodiment with the multitude of catalyst reservoir vessels (1) has the advantage, for example, that the individual vessels can be filled with catalyst during the operation of the apparatus. Those catalyst reservoir vessels (1) that are filled with catalyst here are the ones that are not being used for the metered addition at this time. With regard to the high-temperature operation of the apparatus, it should be noted that an exchange of the valves can be associated with considerable technical complexity. The reason is that the metal bonds of valves and pipelines adhere very firmly to one another owing to the high temperatures. The bond has some similarity with a weld bond. The trickle bed reactor (2) is connected to the catalyst reservoir vessel (1) via the high-temperature valve (10). The term "high temperature" means that the individual components of the apparatus are operated at temperatures of >600° C., preferably at temperatures of >700° C. The embodiment of the apparatus with two or more catalyst reservoir vessels (1) and two or more valves (10) enables introduction of a greater amount of catalyst into the trickle bed reactor (2) since the feeding of the catalyst can be carried out simultaneously from two or more catalyst reservoir vessels (1).

The trickle bed reactor (2) is preferably operated at temperatures in the range from 50 to 1000° C.; the trickle bed reactor (2) is further preferably operated at temperatures in the range from 250 to 800° C.

In addition, it is possible to control the temperature of the individual assemblies of the apparatus, i.e. the catalyst reservoir vessel (1) including the catalyst feed, the trickle bed reactor (2), the liquid feed (8), the separator (3), liquid separator (9), the gas collection vessel (4) and the conduits that transport catalyst or liquid.

The apparatus of the invention and the method of the invention can be used for the conversion of liquid or gaseous reactants. Depending on the particular field of use, the apparatus of the invention may be in different configuration forms.

Preferably, it is a characteristic feature of the apparatus of the invention that the metering unit is a metering unit for liquids that are in liquid form within the temperature range of 25-250° C. The liquids are liquid reactants. The liquids are preferably one or more substances from the group of oils, heavy oils, VGO, residue oils, bio oil, pyrolysis oil, peat oil, lignin, gasoline, diesel, naphtha. It is of course in no way ruled out that the method of the invention is performed in conjunction with gaseous reactants.

In the case of supply of liquid reactants, reaction products including both gaseous and liquid components or also including reactant that has not been converted in the reaction as well as gaseous components are generally formed. In the workup of the product stream, separation of the components present in the product stream is desirable and advantageous. The arrangement of the pressure controller (7) at a point downstream of the liquid separator (9) has the advantage that only the gaseous portion of product fluid stream is guided through the valve of the pressure controller (7). By virtue of no liquid components being guided through the valve of the pressure controller, it is possible to reduce the propensity of the apparatus to faults. A fault could otherwise result through contamination of the valve of the pressure controller via the deposition of oils and liquids having low volatility.

Preferably, individual elements of the apparatus are connected to suitable analysis units that enable characterization of the products formed in the reaction. Preferably, at least the separator (9) and/or the gas collection vessel (4) are connected to an analysis unit. In addition, it is also preferable that the separator (3) is functionally connected to an oxidation gas supply, which enables determination of the carbon on the catalyst in the separator (3) by combustion. In this embodiment, it is then likewise preferable that the exit conduit is connected to an analysis unit for gaseous compounds, with the analysis unit preferably connected to the valve (12).

In one possible embodiment, a reactor with an oxidation catalyst is installed in the connecting conduit from the valve (12) to the analysis unit. The gas released in the combustion is first fully oxidized by means of the oxidation catalyst and then supplied to the analysis unit. The analysis unit may, for example, be an IR measurement cell or a mass spectrometer. Analysis units used may be any analytical measurement devices known to the person skilled in the art for analysis of the products present in the particular case.

In another embodiment, the connecting conduit from the valve (12) to the analysis unit does not have any additional reactor with an oxidation catalyst since both CO and $CO_2$ can be determined by means of the analysis measurement cell used in this embodiment.

In a preferred embodiment, the apparatus of the invention has been equipped with a control system that enables automatic operation of at least parts of the apparatus. It is further preferable that the entire apparatus can be operated fully automatically.

In a further-preferred embodiment, the separator (3) is connected to a collecting vessel. After the stripping of the heavy hydrocarbons from the separator (3) has ended, the catalyst accommodated in the separator (3) can be transferred through a connecting conduit into the collecting vessel. The connecting conduit of separator (3) and collecting vessel has been equipped with a valve which is opened prior to the emptying of the separator (3). The catalyst is transferred either by means of adjustment of an appropriate carrier gas stream, which is sufficiently strong to transfer the catalyst from the separator (3) to the collecting vessel or in that the apparatus is repeatedly put under pressure and the catalyst is then driven each time into the collecting vessel after opening of the valve between the separator (3) and the collecting vessel.

In a preferred embodiment, it is a characteristic feature of the apparatus that the pressure controller (7) in the exit conduit to the outlet of product stream has control dynamics in the region of 1:100, preferably in the region of 1:1000, further preferably in the region of 1:10 000. The control dynamics result from the ratio of the smallest and largest guide value of the valve.

One embodiment of the apparatus of the invention has the particular characteristic feature that the pressure controller (7) in the exit conduit for leading off product stream has a control quality having a deviation in relation to the target value of <10%, the deviation in relation to the target value being preferably <5% and the deviation in relation to the target value further preferably being <1%, and/or the settling time of the controller is in the range of 0.1-30 seconds, the settling time preferably being <10 seconds, further preferably <5 seconds, and especially preferably <2 seconds.

Further preferably, the apparatus of the invention has the characteristic feature that the pressure controller (7) in the exit conduit for leading off product stream and the associated pressure measurement sensor and a controller form a pressure control circuit selected from the group of analog or digital backpressure controllers, preferably an element from the group of actively controlled backpressure controllers having proportional (p), integral (i), proportional-integral (pi), proportional-differential (pd), integral-differential (id) or proportional-integral-differential (pid) time characteristics, the naming of the time characteristics being nonexclusive with regard to the control methods. The control system may be configured here either as main flow control system or as secondary flow control system. The control system is preferably configured as main flow control system.

Furthermore, the apparatus of the invention has the characteristic feature that the metering unit for the supply of liquid reactant fluid has a twin-needle injector and/or in that the metering unit has a high-pressure pump. Preference is given to using a twin-needle injector which is described in detail in PCT application WO 2016/166153 A1. By means of the twin-needle injector according to WO 2016/166153 A1, it is possible to introduce liquids in the form of very fine droplets or a of liquid mist having very fine droplets into the trickle bed reactor. The twin-needle injector according to PCT application WO 2016/166153 A1 is an apparatus for spraying liquids comprising a needle injector, a liquid feed and a gas feed, wherein the needle injector comprises at least one capillary conduit and at least one outer tube and the needle injector has the characteristic feature that the internal diameter of each capillary conduit is in the range of 2-400 μm, the internal diameter of each capillary conduit preferably being in the range of 4-300 μm and further preferably in the range of 5-250 μm, and the capillary conduit is in a coaxial arrangement in the interior of the respective outer tube, the capillary conduit is functionally connected to the gas supply and the outer tube is functionally connected to the liquid supply. Preferably, the tip of the apparatus is configured such that the capillary conduit and the outer tube have a length differential in the range of 0-10 mm, the length differential preferably being in the range of 2-7 mm, it being preferable that the capillary conduit is longer than the outer tube. It is further preferable that the twin-needle injector is heated by means of a heating apparatus. The metering unit for the supply of liquid reactant fluid which is equipped with at least one twin-needle injector enables very efficiently controlled supply of liquid into the apparatus. The carrier gas that introduces the flow energy required for atomization into the system is guided by the capillary conduit, and the liquid by the outer conduit. At the tip of the twin-needle injector, gas and liquid are contacted and a very finely divided liquid mist is generated. The liquid volume flow rate can be controlled very exactly and is preferably within a range of 0.1-20 mL/min (or milliliters per minute). The gas volume flow rate is preferably in the range of 10-300 mL (STP)/min. The temperature of the gas supply is preferably in the range of 20-300° C., further preferably in the range of 80-250° C. The temperature of the liquid supply is preferably in the range of 50-300° C., further preferably in the range of 100-250° C. The temperature of the housing is preferably in the range of 80-700° C., further preferably in the range of 100-650° C., further preferably still in the range of 150-550° C. By means of the metering unit for the supply of liquid reactant fluid which is equipped with the twin-needle injector, it is possible to implement continuous metering or metering in pulsed form. The pulses are preferably in the range of 1-300 seconds. The twin-needle injector is preferably in a vertical arrangement. This means that the axis of the needle tube is preferably aligned parallel in relation to the longitudinal axis of the trickle bed reactor (2). In the case of metering of liquids in the presence of gases by means of the twin-needle injector, the ratio of gas volume flow rate to liquid volume flow rate is preferably in the range of 10-200, further preferably in the range of 12-100. In a preferred embodiment, the invention relates to the combination of apparatus having a trickle bed reactor (2) having a specific liquid injector and the apparatus with a trickle bed reactor (2) having an improved pressure control system.

In a preferred embodiment, the apparatus of the invention has the characteristic feature that the exit conduit for leading off product stream is connected to a gas collection vessel (4).

The invention relates to a method of catalytically converting chemical substances in the presence of pulverulent catalysts with residence times in the range of 0.1-10 seconds, comprising the following steps:
(i) adjusting the temperature of at least one catalyst which is stored in at least one catalyst reservoir vessel (1),
(ii) supplying the catalyst in a controlled manner from the at least one catalyst reservoir vessel (1) to the inlet of a trickle bed reactor (2), wherein at least the catalyst is supplied in the presence of carrier gas,
(iii) contacting the pulverulent catalyst with a feed and passing the mixture of catalyst, feed and carrier gas through the reaction space of the trickle bed reactor (2),
(iv) transferring the mixture of catalyst, feed, carrier gas and products and through the reactor outlet into a separator (3);
(v) separating the feed and the products from catalyst in the separator (3) and removing them via the exit conduit, controlling the backpressure by means of a continuously acting valve, preferably the control valve (7), during the leading-off of feed, carrier gas and products from the exit conduit connected to the separator (3), where the backpressure is in the range of 0.01 barg-15 barg, the backpressure preferably being in the range of 0.05 barg-10 barg, and the backpressure further preferably being in the range of 0.1 barg-7 barg.

In a preferred embodiment, the method of the invention has the characteristic feature that the total period of time in the performance of method steps (ii)-(iii) in which pulverulent catalyst is being conveyed through the trickle reactor is in the range of 10-300 seconds and the changes in pressure on the outlet side of the reactor during the performance of the method are <200 mbarg, the pressure changes on the outlet side of the reactor preferably being <100 mbarg, and the pressure changes on the outlet side of the reactor more preferably being <50 mbarg.

Further preferably, the method of the invention has the characteristic feature that the catalyst supplied in step (i) is FCC catalyst.

In the performance of the method of the invention by means of the monitoring of the pressure using the pressure controller (7) disposed downstream of the separator (3) in the exit conduit, it was unexpectedly possible to improve the differentiation of the method in relation to propene selectivity. Differentiatability in relation to propene selectivity is an important parameter that enables conclusions as to the comparability of catalytic test data.

The invention also relates to the use of the apparatus of the invention and to the performance of the method of the invention in one of the embodiments presented in the context of the present description. The use of the apparatus and the method performed therewith enable an improved analysis of catalytic processes with residence times of the catalyst in the reactor in the range of 0.1-10 seconds, since the pressure monitoring and control have been improved, with the monitoring of pressure being accomplished by means of a control valve (7) disposed in the exit conduit and the associated incorporation of the control valve (7) into the process monitoring.

In relation to the performance of the method, it should be emphasized that the feed of the catalyst is initiated by opening the valve (10), with charging of the catalyst reservoir vessel (1) with a defined, controlled positive pressure. By means of a measurement of pressure differential or control of pressure differential (6) which is undertaken in the connecting conduit between the catalyst reservoir vessel (1) and the separator (3), a defined positive pressure with regard to the trickle bed reactor (2) is established within the catalyst reservoir vessel (1). The positive pressure results in transfer of the catalyst from the catalyst reservoir vessel (1) into the inlet region of the trickle bed reactor (2). The connecting conduit from the catalyst reservoir vessel (1) to valve (10) may have a fluidization gas supply. The fluidization gas supply is the gas conduit feed (17). FIGS. 1 and 2 show the contact point between the catalyst feed and liquid-gas feed somewhat above the trickle bed reactor (2) since the two streams of matter supplied pass through a short mixing zone disposed above the trickle bed reactor (2). However, the mixing zone may also be disposed within the inlet region of the trickle bed reactor (2) and is therefore also considered to be part of the trickle bed reactor (2). The reaction generally commences at the time at which the reactant fluid comes into contact with the catalyst. Preferably, apparatus and method are used for conversion of oil or vacuum gas oil. The main reaction is the catalytic cracking of hydrocarbonaceous components to smaller molecules. It is not ruled out that thermally triggered cracking reactions also proceed alongside catalytic cracking reactions.

The residence times of the catalyst in the trickle bed reactor (2), which are relatively short and in the range from 0.1 to 10 seconds, depend on the length of the reactor and the method parameters. The apparatus of the invention and the method of the invention are used to analyze reactions that proceed rapidly and are accompanied by rapid deactivation of the catalyst, and in which a steady state is established even in the time range of a few milliseconds up to one or two seconds. The period for performance of the method is preferably within a range of 10-500 seconds, further preferably within a range of 15-300 seconds and especially preferably within a range of 20-80 seconds. Within the period in question, it is possible to collect a representative amount of product components characteristic of a given set of method parameters. At the end of a given period, the feed of the catalyst and the supply of the reactant components to the trickle bed reactor (2) is stopped. Thus, method step (ii) is ended, and residual amounts of catalyst and reactant at this time are still guided through the trickle bed reactor (2) as per method step (iii) and into the separator (3) as per method step (iv). Once the supply of product and catalyst to the separator (3) has ended, the catalyst stored in the separator (3) is purged with a stripping gas for a further period in order to remove volatile product components that have been adsorbed by the surface of the catalyst. The duration of the treatment of the catalyst in the separator (3) after the catalyst supply has ended is within the time range of 0-600 seconds, preferably within the time range of 30-300 seconds.

All products formed in the reaction and are subjected to a qualitative and a quantitative determination, also ascertaining the amount of unconverted reactant components. In the conversion of oils, the amount of carbon on the catalyst is determined, and the amounts of gaseous and liquid components and their composition. Using the analysis results, conversions and selectivities are determined for the individual product components and these are expressed in relation to the set of experimental method parameters chosen in each case for the cracking.

It is of course also conceivable that methods are conducted in such a way that multiple different process parameters in succession are established during the performance of the method. In the configuration of the method to date, the method is performed in such a way that the amount of liquid product is determined by weighing. For this purpose, the liquid separator currently has to be deinstalled. In principle, there exist ways of further improving the method by a reconfiguration and automation, such that, for example, continuous monitoring of the conversion is enabled.

A further advantage of the apparatus of the invention is also that the method of the invention gives high flexibility with regard to the gauge pressure value at which the method is performed. The method of the invention can be performed at any pressure for which the pressure-rated components have been designed. In a preferred embodiment, the method is performed at a pressure in the range of 0.1-10 barg, preferably in the range of 0.3 to 5 barg. In one aspect of the method of the invention, the method can be performed in the high-pressure range, the high-pressure range being defined by a pressure in the range from 1.5 to 10 barg, preferably a pressure in the range from 2 to 8 barg. It is of central significance for the invention in this connection that it enables pressure control via the valve of the pressure controller (7), that a further adjustment range can be implemented at this position in the exit conduit. Further preferably, the valve of the pressure controller (7) in the control system has settling times with which the pressure control circuit settles out within a period of <100 ms, preferably a period of <70 ms and further preferably within a period of <50 ms. The rapid settling times of the pressure control zone are of significance especially in the case of cracking reactions since the cracking reactions are associated with a great increase in volume. In the case of cracking reactions, depending on the respective cracking activity, it is possible that the volume flow rate increases by five times compared to the volume flow rate of the oil supplied in the carrier gas.

The gas collection vessel (4) may be manufactured either from glass or from metal. One aspect of the apparatus of the invention and of the method of the invention is that the interior of the gas collection vessel (4) is subjected only to a slightly positive gauge pressure that does not exceed, for example, 300-400 mbarg. The continuously acting valve disposed in the exit conduit serves as pressure reduction. This throttling effect prevents the region downstream of the valve from being subjected to a high positive pressure, which also constitutes an advantage of the present invention.

In relation to the housing of the separator (3), it can be stated that it preferably has a volume in the range from 0.1 to 2 liters, further preferably in the range from 0.2 to 1 liter. It is also an advantageous aspect of the present invention that the apparatus can be operated within a wide pressure range within the range from 0.01 to 15 barg. If parts of the apparatus consist of glass, there may be a limitation with regard to the pressure resistance thereof. The same also applies in principle to the characteristics of the liquid separator (9). It is thus preferable that the liquid separator (9) is manufactured from a metal.

A central aspect of the apparatus of the invention and of the method of the invention is that the method can be performed under very constant pressure conditions and the pressure variations are ≤200 mbarg, preferably ≤100 mbarg, further preferably ≤50 mbarg.

The following two configurations of the method are possible in order to keep the total pressure constant during the performance of the method of the invention: A. guiding the flow of the inert gases supplied and B, guiding the gases flowing out depending on the incoming flow and the gases that form additionally as a result of the reaction.

The guiding of the incoming inert gas flows according to configuration form A. leads to a change in the partial pressures since the flows are altered. If large amounts of gaseous products are formed, the amount of inert gas can be greatly reduced. As a result, the conversion, yields and selectivities would change during the reaction. In addition, the catalyst flow into the reactor is altered since the inert gas flows additionally have the function of maintaining the pressure drop between catalyst reservoir and reactor and hence are responsible for the continuous and constant metering of the catalyst. If the incoming inert gas flows were controlled in accordance with the changes in the system pressure, continuous and constant metering would no longer be possible. Thus, the embodiment of the method according to configuration form (A) is a less preferred execution.

For configuration form B., which is also elucidated in the present description, a particularly preferred configuration form has been discovered.

The pressure control circuit is implemented here individually from the components of pressure measurement sensor as actual value sensor, controller and actuator. A suitable actual value sensor is any pressure measurement sensor directly functionally connected to the trickle bed reactor (2), separator (3), liquid separator (9), or the respective conduits connecting these components. The pressure controller (7) is preferably a controller from the group of pneumatic controllers, electrical controllers and digital controllers. Further preferably, a pressure controller (7) configured as a relief valve, further preferably as a membrane relief valve, is used in the exit conduit. The relief valve forms a control circuit, where the actuator element is simultaneously the actual value sensor. In the case of the membrane relief valve, the target value is transmitted by loading the membrane with a gas pressure from the side remote from the reaction space. FIG. 1 and FIGS. 2.a to 2.d show different embodiments of the apparatus of the invention.

In a preferred embodiment, the method of the invention has the characteristic feature that the actual value for the pressure controller is obtained by combining the signal from at least two different pressure sensors, with combination of the signals. A preferred method of combining the signals from the pressure sensors is formation of an average; preference is additionally given to formation of a weighted average.

Example

For illustration of the apparatus of the invention and the method of the invention, the catalytic conversion of mineral oil in the presence of a zeolite-containing FCC catalyst was analyzed by way of example—specifically by means of the apparatus shown in FIG. 2.a and, for comparative purposes, by means of the apparatus shown in FIG. 1. It should be pointed out that the apparatuses shown in FIGS. 1 and 2.a were equipped with the base components of the same design. The base components comprised a feed supply with a twin-needle injector, a catalyst reservoir vessel, a reactor tube, a receiving vessel for catalyst, a liquid separator and a gas collection vessel, and analysis units. The reaction tube used here had a length of 1.5 meters and an internal diameter of 9 millimeters. The receiving vessel for the catalyst had a capacity of 700 g of catalyst. The apparatus shown in FIG. 2.a is a further development of the apparatus shown in FIG. 1.

In the apparatus shown in FIG. 2.a, an Equilibar valve (supply pressure regulator) having a dynamic range of 1:250 and having a settling time in the region of 0.5 second is disposed in the conduit between the liquid separator (9) and the gas collection vessel (4).

In the analyses, a zeolite-containing FCC catalyst that had an average particle diameter of about 70 μm and a BET surface area in the region of 120 $m^2/g$ was used. The determination of the average particle diameter was based on laser scattering measurement by means of a Beckman Coulter laser scattering measurement device, and the BET surface area was determined on the basis of a nitrogen adsorption measurement with a Tristar unit from Micromeritics. The feed used for the analyses was a VGO (vacuum gas oil) having a Conradson carbon content of 0.3% by weight.

A catalyst was analyzed in five measurement series at four different pressures. A comprehensive illustration of the experiments conducted by way of example is given in table 1. The experiments were conducted at the pressures of 0.5, 1.2, 1.5 and 2.5 barg. The experiments that were conducted in accordance with the prior art were identified as VS1 and VS2. Comparative series VS1 was conducted at 1.2 bar, and comparative series VS2 at 0.5 bar. The experiments in the method of the invention that are characterized in table 1 as series S1, S2 and S3 were conducted at 0.5, 1.5 and 2.5 barg. In addition, the ratio of catalyst to oil to be converted was varied in order to obtain different degrees of conversion or yields. The experiments according to the prior art were performed at 3-4 different cat-to-oil ratios. The inventive experiments were conducted at about 5-9 different catalyst-to-oil ratios. Cat/oil ratios entered in table 1 were in the range of 5-15.

By means of the apparatus of the invention, two different kinds of cracking experiments for conversion of vacuum gas oil were conducted, in each of which the pressure was recorded by means of the pressure measurement sensor on the reactor exit side.

Figure 3:
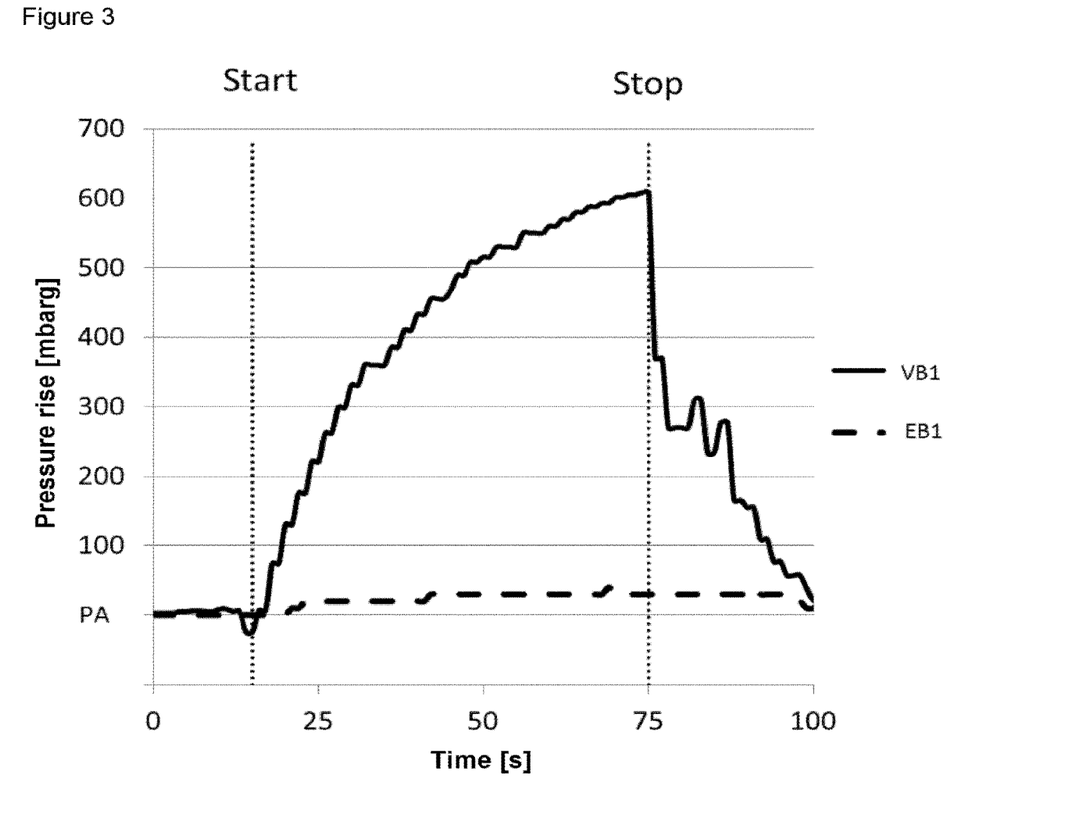
FIG. 3 shows pressure progressions in the performance of the catalytic analysis by the method of the invention (see experimental example EB1 with dotted line) and by the method corresponding to the prior art (see comparative example VB1 with solid line). The initial pressure at the start of each analysis was identified by PA in the figure. The duration of each cracking experiment is about 60 seconds, with the commencement identified by start and the end by stop.

In the first type of experiments, these were conducted by the method known from the prior art, i.e. with a conduit and valve system having a constant flow resistance on the exit side. In the second type of cracking experiments, these were performed by the method of the invention using the apparatus shown in FIG. 2.a, i.e. with a pressure controller with rapid settling characteristics on the exit side. The results of these analyses are shown in FIG. 3.

In the performance of a cracking experiment in the context of a comparative example VB1, it is apparent that the pressure does not remain constant over the experiment time, but first rises and drops at the end of the experiment. FIG. 3 shows the (reactor) pressure progression over the duration of an experiment. The duration of the reactant fluid supply and the cracking, identified by start and stop in FIG. 3, in the present case was 60 seconds. In the experiment shown, which was performed by the method known from the prior art (i.e. curve VB1 in FIG. 3), a pressure rise having a value of 600 mbarg was recorded by means of the pressure measurement sensor. The abbreviation PA indicates the exit pressure at the start of the experiment. The performance of the same cracking experiment by the method of the invention, shown in the curve EB1 in FIG. 3, led to a pressure that remained constant over the period of reactant fluid supply and also in the period thereafter, i.e. during the passage of inert gas through the collecting vessel. The change in pressure in the inventive experiment (i.e. EB1 in FIG. 3) was not higher than 20 mbarg.

In general, the cracking experiments are also always associated with a rise in the volume within the reactor. This is particularly true of the cracking of vacuum gas oils, since the reaction gives rise to numerous gaseous products. Thus, a pressure rise is also to be expected during the individual cracking experiments, and is a pointer that the experiment is running without disruption.

A significant improvement has been achieved by means of the method of the invention in that an apparatus having a pressure control system on the reaction space exit site has been provided. The method of the invention is based on improved process monitoring that uses the pressure data of the pressure measurement sensor ascertained on the reaction space exit side to alter the pressure conditions in such a way that these are virtually constant over the duration of the method. As a result, the pressure conditions during the performance of the method can be further improved than has been possible to date by the method according to the prior art. The method of the invention has higher accuracy in terms of propene selectivity than the method known in the prior art. Thus, the sensitivity of the method is advantageous overall compared to the method known from the prior art.

Figure 4:
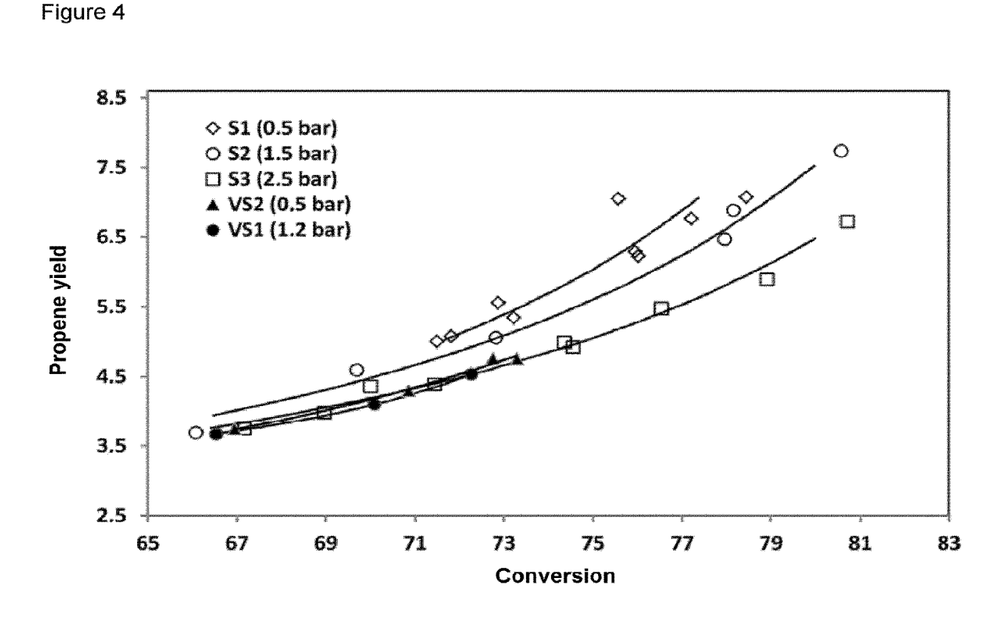

As an example, FIG. 4 shows the results of multiple series of experiments for formation of propene that have been performed at different reactor pressures; the filled symbols show the results for the disclosed original construction that have no pendency in pressure. The pressure stated is the pressure value at the start of the experiment. By contrast, the unfilled symbols show the results that have been achieved by means of the method of the invention at the gauge pressures of 0.5 barg (rhombus), 1.5 barg (circle) and 2.5 barg (square). The formation of propene decreases with increasing pressure since, for example, hydrogenation to propane is preferred. It also becomes clear that, as a result of the incorporation of higher-quality components designed for a higher reaction pressure, an extended range of process parameters is available for determination of conversion, yields and selectivities.

The option of adjusting and monitoring the pressures during the performance of the method of the invention in an improved manner makes it possible to better reproduce the operation of industrial scale FCC plants. Owing to the improved reproduction based essentially on the improved possibility of pressure values and improved pressure control system, it is possible by means of the method of the invention to achieve yields of reaction products that better correspond to the yields in plants operated on the industrial scale.

Table 1 shows an overview of the catalytic cracking experiments conducted that have been divided into five measurement series. The three measurement series S1, S2 and S3 were conducted in conjunction with the pressure control system. The two comparative series VS1 and VS2 were conducted without the pressure regulation system of the invention.

| Series | Cracking | Pressure [barg] | Conversion [%] | Propene yield [% by wt.] |
| --- | --- | --- | --- | --- |
| S1 | C1 | 0.5 | 71.8 | 5.00 |
| S1 | C2 | 0.5 | 72.8 | 5.00 |
| S1 | C3 | 0.5 | 73.0 | 5.56 |
| S1 | C4 | 0.5 | 76.0 | 5.35 |
| S1 | C5 | 0.5 | 75.9 | 7.05 |
| S1 | C6 | 0.5 | 76.0 | 6.29 |
| S1 | C7 | 0.5 | 77.2 | 6.22 |
| S1 | C8 | 0.5 | 78.0 | 6.76 |
| S2 | C9 | 1.5 | 66.1 | 4.00 |
| S2 | C10 | 1.5 | 69.7 | 4.60 |
| S2 | C11 | 1.5 | 72.8 | 5.00 |
| S2 | C12 | 1.5 | 78.0 | 6.47 |
| S2 | C13 | 1.5 | 78.0 | 7.00 |
| S2 | C14 | 1.5 | 80.6 | 7.74 |
| S3 | C15 | 2.5 | 67.2 | 3.75 |
| S3 | C16 | 2.5 | 69.0 | 4.00 |
| S3 | C17 | 2.5 | 70.0 | 4.36 |
| S3 | C18 | 2.5 | 71.0 | 4.39 |
| S3 | C19 | 2.5 | 74.0 | 5.00 |
| S3 | C20 | 2.5 | 74.5 | 4.92 |
| S3 | C21 | 2.5 | 77.0 | 5.48 |
| S3 | C22 | 2.5 | 78.9 | 5.89 |
| S3 | C23 | 2.5 | 81.0 | 7.00 |
| VS1 | C24 | 1.2 | 67.0 | 3.74 |
| VS1 | C25 | 1.2 | 70.9 | 4.29 |
| VS1 | C26 | 1.2 | 72.75 | 4.76 |
| VS1 | C27 | 1.2 | 73.30 | 4.75 |
| VS2 | C28 | 0.5 | 66.5 | 3.67 |
| VS2 | C29 | 0.5 | 70.1 | 4.10 |
| VS2 | C30 | 0.5 | 72.3 | 4.53 |

In relation to the statement of pressure, it should be stated that barg has been chosen as the unit for relative pressure figures within the present description.

Results that have been achieved using the apparatus known in the prior art and not shown in the figures did not show any pressure-dependent differences in propene selectivity in the product stream in different experiments in which the reactor pressure was varied (FIG. 4, filled symbols). By contrast, it was possible by means of the experiments that were conducted by means of the apparatus of the invention and the method of the invention (FIG. 2) to see a very clear dependence of the propene yield on the pressure (unfilled symbols).

BRIEF DESCRIPTION OF THE FIGURES

FIG. 2.a shows the schematic diagram of an apparatus in one configuration of the invention with a trickle bed reactor (2), in this embodiment with a pressure regulator (7) disposed in the exit conduit leading from the liquid separator (9) to the gas collection vessel (4) that can take its actual value from different points in the apparatus. The actual pressure value may be in the region of the inlet to the trickle bed reactor (2), in the region of the outlet from the trickle bed reactor (2) or in the region of the gas exit conduit. The functional connection (21) leads to the inlet of the trickle bed reactor (2); the functional connection (20) leads to the inlet of the separator (3) and is close to the exit from the trickle bed reactor (2). The functional connection (22) shows the embodiment with taking of the actual pressure value close to the continuously acting valve of the pressure controller (7).

FIG. 2.*b* shows a schematic diagram of the embodiment of the pressure controller (7) as a secondary stream pressure control system.

FIG. 2.*c* shows a schematic diagram of the embodiment of a pressure controller (7) by means of a relief valve. This is a specific embodiment with a membrane relief valve having the characteristic feature that the actual pressure value is taken in the valve itself.

FIG. 2.*d* shows a schematic diagram of the apparatus of the invention equipped with a separate gas supply (18). The separator (3) is functionally connected to the negative target value input of the pressure differential controller (6), while the positive target value input of the pressure differential controller (6) is functionally connected to the catalyst reservoir vessel (1). There is a further functional connection between the reservoir vessel (1) and the input of a valve which is actuated by the pressure controller (6). The output from the valve is configured as a waste air conduit (19). An auxiliary gas is likewise supplied via conduit (17), which, especially with the valve (10) closed, ensures that catalyst powder above the valve is loosened and hence remains free-flowing.

FIG. 4 shows formation of propene as a function of the conversion established by the ratio of catalyst to oil (i.e. the C/O ratio or the cat/oil ratio). The figure for the propene yield and the conversion are reported in % by weight. The measurement series S1, S2 and S3 show the data that have been achieved at the pressures of 0.5 bar, 1.5 bar and 2.5 bar by the method of the invention. The measurement series VS1 and VS2 show the data that have been performed by the comparative experiments, with the starting pressures (in the case of VS2) at 0.5 bar and (in the case of VS1) at 1.2 bar.

LIST OF REFERENCE SIGNS

1—Catalyst reservoir vessel
2—Trickle bed reactor
3—Separator with an inner region divided by a porous plate for storage of the catalyst in the fluidized state
4—Gas collection vessel
5—Pressure measurement sensor in the catalyst reservoir vessel or in the gas supply conduit to the catalyst reservoir vessel
6—Pressure differential controller functionally connected between catalyst reservoir vessel (1) and trickle bed reactor (2)
7—Pressure regulator in the exit conduit, functionally connected to the separator (3)
8—Liquid reservoir vessel
9—Liquid separator
10—Valve to release the catalyst flow
12—Valve in the exit conduit between the separator (3) and the liquid separator (9)
14—Pump, preferably a high-pressure pump
15—Pressure measurement sensor connected to the liquid supply or the reactor inlet
16—Pressure measurement sensor connected to the conduit between pressure differential controller (6) and separator (3)
17—Gas conduit supply
18—Gas supply
19—Waste air conduit
20—Actual pressure value in the gas supply to the separator (3) and hence functionally connected to the trickle bed reactor (2)
21—Actual pressure value at the reactor inlet
22—Actual pressure value in the conduit downstream of the liquid separator (9), which is thus likewise characteristic of the pressure in the region of the reactor exit

What is claimed is:

1. An apparatus for catalytic conversion of chemical substances in the presence of at least one pulverulent catalyst in a reactor with a residence time of the at least one pulverulent catalyst in the range of 0.1-10 seconds, comprising:
   a reactor arranged vertically;
   at least one catalyst reservoir vessel, wherein the reactor is configured to receive the at least one pulverulent catalyst from the catalyst reservoir vessel and to transport the at least one pulverulent catalyst through the reactor during catalytic conversion;
   at least one separator comprising at least one exit conduit for leading off product stream, wherein the at least one catalyst reservoir vessel is operatively coupled to the at least one separator, a pressure differential controller disposed therebetween, wherein the pressure differential controller is configured to actuate a continuously acting valve, and
   a first pressure measurement sensor in communication with the continuously acting valve, wherein the continuously acting valve and the first pressure measurement sensor form a pressure control circuit with the controller,
   wherein an outlet side of the continuously acting valve is operatively coupled to the at least one separator or a waste air conduit, wherein when the continuously acting valve is coupled to the waste air conduit, the separator comprises a gas feed, the first pressure measurement sensor configured to measure pressure of the gas feed, and the separator configured to separate the gas feed from a reactant product received from the reactor,
   wherein the reactor is a tubular reactor having a length in the range of 0.3-3 m and a diameter in the range of 0.3-10 cm, and
   wherein an inlet side of the reactor is operatively coupled to the at least one catalyst reservoir vessel and at least one reactant feed, and an outlet side of the reactor is operatively coupled to the at least one separator.

2. The apparatus according to claim 1, further comprising a temperature control system for controlling temperature of one or more of the at least one catalyst reservoir vessel, the reactor, or the at least one separator.

3. The apparatus according to claim 1, wherein the continuously acting valve is in communication with a second pressure measurement sensor configured to measure pressure of an input region of the reactor, an output region of the reactor or an exit conduit for leading off product stream.

4. The apparatus according to claim 1, further comprising:
   a metering unit for supply of liquid reactant fluids selected from the group consisting of oils, heavy oils, vacuum gas oil (VGO), residue oils, bio oil, biomass, pyrolysis oil, peat oil, lignin, gasoline, diesel and naphtha, and optionally, a liquid separator operatively coupled to the at least one separator, wherein the liquid separator is disposed upstream of the continuously acting valve.

5. The apparatus according to claim 1, wherein the continuously acting valve is arranged in the exit conduit for leading off product stream and has a control dynamic having a ratio of smallest guide value to largest guide value of 1:100.

6. The apparatus according to claim 1, wherein the continuously acting valve has a control quality having a deviation in relation to a target value of <10%.

7. The apparatus according to claim 1, wherein the continuously acting valve and the first pressure measurement sensor form a pressure controller of analog or digital backpressure controllers.

8. The apparatus according to claim 4, wherein the metering unit comprises a) a twin-needle injector, b) a high-pressure pump, or both a) and b).

9. The apparatus according to claim 1, wherein the at least one exit conduit for leading off product stream is operatively coupled to a gas collection vessel.

10. A method of catalytically converting chemical substances in the presence of at least one pulverulent catalyst with a residence time of the at least one pulverulent catalyst in the range of 0.1-10 seconds, the method comprising:
  (i) adjusting the temperature of at least one pulverulent catalyst stored in at least one catalyst reservoir vessel,
  (ii) supplying the at least one pulverulent catalyst in a controlled manner from the at least one catalyst reservoir vessel to an inlet of a reactor, wherein the at least one pulverulent catalyst is supplied in the presence of a carrier gas,
  (iii) contacting the at least one pulverulent catalyst with at least one feed to form a mixture of the catalyst, feed and carrier gas, passing the mixture through a reaction space of the reactor and forming reaction products,
  (iv) transferring the mixture and reaction products through an outlet of the reactor and into a separator,
  (v) separating feed and reaction products from the at least one pulverulent catalyst in the separator and removing the reaction products via an exit conduit,
    controlling backpressure in the exit conduit by a continuously acting valve, wherein the backpressure is controlled in the range of 0.01 barg-15 barg.

11. The method of claim 10, wherein:
  a period of time for the performance of (ii)-(iii) is 10-300 seconds, and
  a change in pressure on the outlet side of the reactor during the performance of the method is <200 mbarg.

12. The method of claim 10, wherein a sampling time of the backpressure control is pulsed or continuous and the sampling time is in the range of 0.0001-300 seconds.

13. A method of catalytically converting chemical substances in the presence of at least one pulverulent catalyst with a residence time of the at least one pulverulent catalyst in the range of 0.1-10 seconds, in the apparatus of claim 1, the method comprising:
  (i) adjusting a temperature of the at least one pulverulent catalyst, wherein the at least one pulverulent catalyst is stored in the at least one catalyst reservoir vessel;
  (ii) supplying the at least one pulverulent catalyst in a controlled manner from the at least one catalyst reservoir vessel to the inlet side of the reactor, wherein the at least one pulverulent catalyst is supplied in the presence of a carrier gas;
  (iii) contacting the at least one pulverulent catalyst with at least one feed to form a mixture, and passing the mixture of catalyst, feed and carrier gas through a reaction space of the reactor to form reaction products;
  (iv) transferring the mixture and reaction products through the outlet side of the reactor into the separator;
  (v) separating feed and reaction products from the at least one pulverulent catalyst in the separator and removing the reaction products via an exit conduit; and
  (vi) controlling backpressure in the exit conduit by a continuously acting valve, wherein the backpressure is controlled in the range of 0.01 barg-15 barg.

\* \* \* \* \*